United States Patent [19]

Hänle et al.

[11] 4,109,133
[45] Aug. 22, 1978

[54] ELECTRICALLY HEATED REAR WINDOW FOR AUTOMOTIVE VEHICLES

[75] Inventors: Edgar Hänle, Wettstetten; Ferdinand Piëch, Ingolstadt, both of Germany

[73] Assignee: Audi Nsu Auto Union AG, Neckarsulm, Germany

[21] Appl. No.: 659,018

[22] Filed: Feb. 18, 1976

[30] Foreign Application Priority Data

Feb. 19, 1975 [DE] Fed. Rep. of Germany ....... 2507037

[51] Int. Cl.² .................. A47L 1/16; H05B 3/26; B60S 1/02
[52] U.S. Cl. ................ 219/203; 15/250.05; 52/171; 98/2.1; 165/41; 219/522; 219/547; 296/84 E
[58] Field of Search ............ 219/202, 203, 522, 547; 98/2.1; 237/12.3 R, 12.3 B; 165/41; 15/250.05, 250.16; 52/171; 296/84 R, 84 E, 95 Q

[56] References Cited

U.S. PATENT DOCUMENTS

| | | | |
|---|---|---|---|
| 1,556,030 | 10/1925 | Redshaw | 15/250.05 |
| 1,942,057 | 1/1934 | Gray | 219/203 |
| 2,662,154 | 12/1953 | Cochran | 15/250.05 |
| 2,693,612 | 11/1954 | Zeigler et al. | 52/171 X |
| 2,947,020 | 8/1960 | Wilfert et al. | 15/250.16 |
| 3,738,252 | 6/1973 | Cardinale | 237/12.3 B |

FOREIGN PATENT DOCUMENTS

| | | | |
|---|---|---|---|
| 8,247 of | 1927 | Australia | 15/250.05 |
| 1,291,647 | 3/1969 | Fed. Rep. of Germany | 296/84 R |

*Primary Examiner*—A. Bartis
*Attorney, Agent, or Firm*—Karl F. Ross

[57] ABSTRACT

A rear window for an automotive vehicle has imbedded at an upper portion thereof resistance-heating wires for the electrical heating of the window. A window wiper is provided to sweep the window which has a lower portion free from the heating conductors. In its rest (inoperative) position the wiper lies against a portion of the window provided with additional heating elements for rapidly heating the rest position of the wiper to free the wiper, if frozen to the window, to enable the wiper to be brought into play without delay.

10 Claims, 3 Drawing Figures

ELECTRICALLY HEATED REAR WINDOW FOR AUTOMOTIVE VEHICLES

FIELD OF THE INVENTION

The present invention relates to electrically heated automotive-vehicle windows and, more particularly, to electrically heated rear windows of the type in which resistance wires are provided over only a portion of a window to permit the remainder thereof to form a free-visibility zone. In particular the invention relates to an electrically heated window provided with a window wiper having a rest position against a lower portion of the window.

BACKGROUND OF THE INVENTION

Powered wipers for automotive-vehicle windows and especially the rear windows of station wagons and other vehicles in which the window has a steep incline or is substantially upright, have gained widespread acceptance in the art since a window wiper is capable of clearing the rear windows of dirt and other view-obstructing substances which tend to collect upon the rear window of the vehicle when the latter travels through wet streets because of the vortex action of the air stream trailing the vehicle. In its rest position, the window wiper lies against the window at the lower edge thereof so as not to obstruct the view of the driver.

For the heating of automotive vehicles and especially the rear window of an automotive vehicle, e.g. for deicing and defrosting thereof, resistance-heating wires are imbedded in the glass pane in a number of passes so that, upon the passage of electrical current through the heating wire, the temperature of the window is raised to a level sufficient to melt ice and prevent the formation of view-obstructing condensates thereon.

To prevent obstruction of the visibility of the driver of the vehicle, the window is generally provided with the resistance wires only over an upper portion of the window so that the lower portion thereof provides a free field of view. In addition this confinement of the wires to the upper part of the window prevents overloading of the current source energizing the resistance heating wires. In general, therefore, the lower portion of the window is free from resistance heating wires.

Upon icing up of the rear window, the wiper frequently freezes to the window along its lower edge and, upon actuation of the wiper motor, may cause the rubber blade to tear or cause other damage to the drive system. While the section of the window provided with the resistance heating wires is rapidly defrosted, the low conductivity of the window pane results in a delayed release of the wiper and hence the latter is only freed after substantial delay when the heat from the exhaust gas stream reaches the window.

Because of the generally widespread use of salt on the road, it is not uncommon that the roadways are wet even though the temperature is below freezing. Consequently the rear window may be coated with dirt even when the upper portion has been defrosted and the wiper is still incapable of clearing the lower portion which is intended to provide a free field of view.

OBJECT OF THE INVENTION

It is the object of the present invention to obviate this difficulty and allow, even at freezing temperatures, the rear window wiper to become effective rapidly.

SUMMARY OF THE INVENTION

This object is attained in accordance with the present invention, in combination with a rear window provided with resistance wires in the upper zone, a lower zone substantially free from resistance wires to provide an unobstructed field of vision, and a window wiper which lies, in its rest position, along a low edge of the window, by a system for rapidly freeing the wiper to enable the same to sweep across at least the lower portions of the window to clear the latter. This system comprises additional resistance heating wires imbedded in the window along the lower edge thereof at least at the region of the window which consitutes the rest position of the wiper. The additional resistance heating wires are preferably connected to the energizing circuit for the main resistance heating wires which span the upper zone of the rear window.

Thus, when the defroster wires are energized, not only is the upper zone rapidly cleared of ice, but the region of the rest position of the wiper blade is simultaneously defrosted so that the wiper can be brought into play.

It is important in the system of the present invention to leave a substantial portion of the window, below the upper heated zone and above the region thereof heated by the additional wires, free from resistance heating wires so that an unheated but unobstructed visibility can be obtained.

The additional resistance heating wires or wire can extend over the entire width of the window along the lower edge or only over a region corresponding to the layer of the wiper blade in its rest position. To increase the zone in contact with the wiper blade which is heated, a single wire can be formed with undulations in this region.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
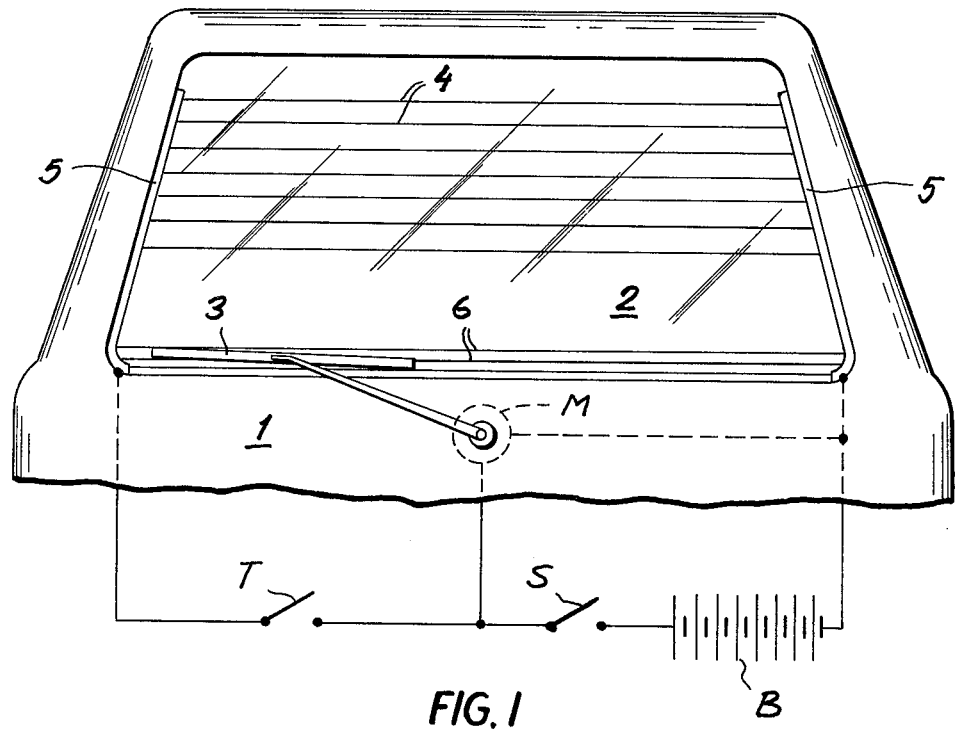
FIG. 1 is a diagrammatic rear elevational view of a portion of the rear of a station-wagon-type vehicle provided with a rear window in which the additional resistance wires extend over the full width of the window.

In the drawing we show the rear 1 of a station-wagon-type automotive vehicle having an electrically heatable rear window 2 which can be cleaned by a wiper blade 3 displaceable on the usual arm by an electric motor M energized by a switch S from the vehicle battery B.

Figure 2:
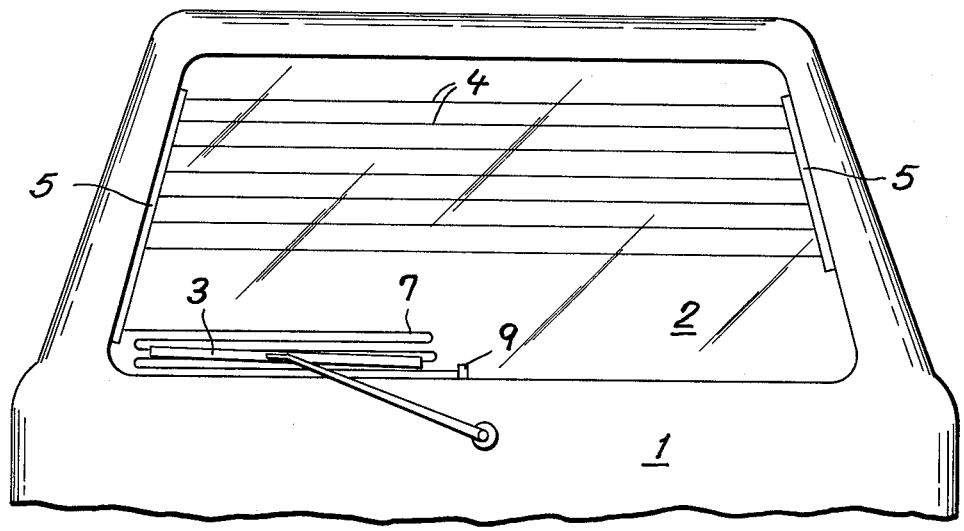
FIG. 2 is a similar elevational view showing a rear window according to the invention in which the additional resistance heating wires extend only over a fraction of the width of the rear window corresponding substantially to the length of the wiper blade.
Figure 3:
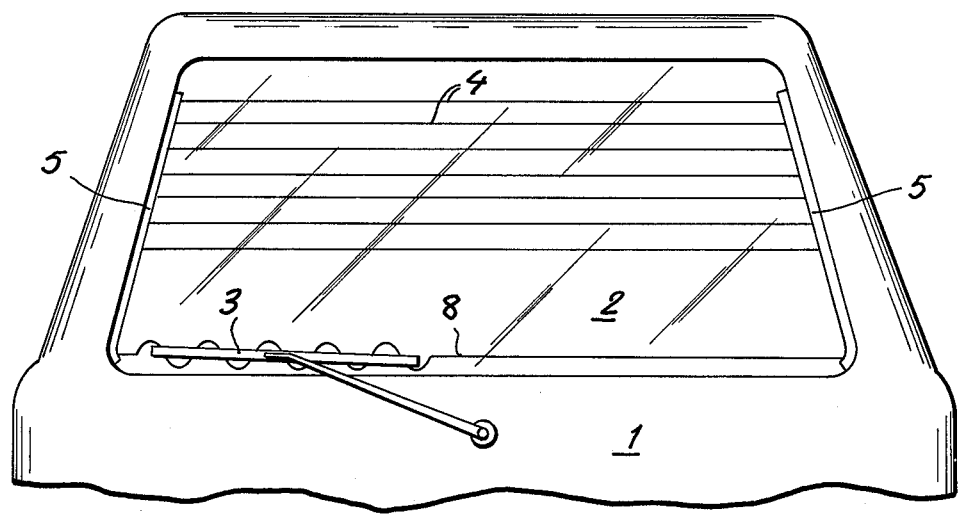
FIG. 3 is another view similar to FIG. 1 in which a single additional resistance heating wire is provided and the area of the heated zone in contact with the wiper blade is increased by forming the wire in this zone with an undulation configuration.

The wiper blade 3 lies, in its rest position shown in FIGS. 1 – 3, along the left-hand lower ledge of the window 2.

The window 2 is provided with a lower relatively narrow zone which is free from resistance heating wires and constitutes a free field of view. Above this zone, the window is provided with a heated zone which is spanned by resistance heating wires 4 which can be imbedded or bonded to the window.

The resistance heating wires 4 extend horizontally over the entire width of the rear window and are connected to bus bars 5 along the opposite lateral edges thereof. The electrical curent source B is connected across the bus bars 5 and can be switched on by switch T to defrost the window.

Along the lower edge of the window (FIG. 1) additional resistance heating wires 6 are provided so that these resistance heating wires heat the window in the region in which the blade 3 lies thereagainst in its rest position. The additional wires 6 are also connected to the same circuit as wires 4, i.e., are connected in parallel thereto.

In the embodiment of FIG. 2, a single additional resistance heating wire 7 is provided in a plurality of back-and-forth horizontal passes each of which has a length approximately equal to the length of the wiper blade, this heating wire being confined only to the left hand lower edge of the window. A terminal 9 connects one end of the wire 7 to the right hand bus bar 5 while the other end of the wire 7 is connected to an elongated left hand bus bar 5 for energization in parallel with resistance wire 4. Since only a single wire is added in this system, the current consumption is less than in the embodiment of FIG. 1.

In the embodiment of FIG. 3 a single additional resistance wire 8 is provided but extends the entire width of the window, this wire being formed with sinusoidal undulations at the left-hand side of the lower edge of the window to increase the width of the heated area in contact with the wiper blade.

We claim:

1. A rear window assembly for an automotive vehicle comprising:
    a rear window;
    a wiper for said window having a blade adapted to sweep across the same and having a rest position over a limited portion of the width of said window along the lower edge thereof;
    an array of substantially uniformly spaced primary resistance-heating conductors bonded to said window over an upper zone thereof, the lower zone of said window below said upper zone and above said lower edge being free from resistance-heating conductors and having an unobstructed field of view;
    at least one secondary resistance-heating conductor disposed and bonded to said window below said lower zone in the immediate region of and extending over said rest position along only said lower edge for heating said rest position of said wiper to release said blade under freezing conditions upon electrical energization of said at least one secondary conductor, said at least one secondary conductor being spaced from the lowermost conductor of said array by a distance greater than the spacing of the primary conductors of said array and extending across the bottom portion of said lower zone of said window free from conductors; and
    means for energizing said conductors.

2. The assembly defined in claim 1 wherein all of said resistance-heating conductors are wires.

3. The assembly defined in claim 2 wherein said at least one secondary conductor comprises a plurality of closely spaced wires extending the full width of said window along the lower edge thereof.

4. The assembly defined in claim 2 wherein a single wire forms said at least one secondary conductor.

5. The assembly defined in claim 4 wherein said single wire is formed in a plurality of horizontal passes only in the immediate region of contact of said wiper with said window in the wiper rest position.

6. The assembly defined in claim 5 wherein said single wire extends to one lateral edge of said window but terminates short of the opposite lateral edge thereof.

7. The assembly defined in claim 4 wherein said single wire has an undulating configuration in the immediate region of contact of said blade with said window.

8. The assembly defined in claim 2 wherein said means for energizing said conductors comprises common buses disposed along opposite edges of said window and connected to all of said wires.

9. The assembly defined in claim 2 wherein said means for energizing said conductors comprises a common bus bar connected to one end of each of said wires, said at least one secondary conductor being a single wire connected at its other end to another terminal and the other ends of said primary conductors being connected to yet another bus bar.

10. The assembly defined in claim 2 wherein said at least one secondary conductor is a wire which extends only over a portion of the width of said window corresponding substantially to the length of said wiper and is disposed at the rest position of said wiper.

* * * * *